Dec. 11, 1951 F. E. TUTTLE ET AL 2,578,327
HIGH-SPEED CAMERA
Filed Sept. 7, 1949 3 Sheets-Sheet 1

FORDYCE E. TUTTLE
WILLIAM BORNEMANN
INVENTORS

Daniel S. Mayne
BY
ATTORNEYS

Patented Dec. 11, 1951

2,578,327

UNITED STATES PATENT OFFICE 2,578,327

HIGH-SPEED CAMERA

Fordyce E. Tuttle and William Bornemann, Rochester, N. Y., assignors to Eastman Kodak Company, Rochester, N. Y., a corporation of New Jersey Application September 7, 1949, Serial No. 114,352

18 Claims. (Cl. 95—36)

1

The present invention relates to photography and particularly to a camera, or a camera back, which may be attached to a conventional camera in place of its regular back, for photographing a moving object, or a plurality of different stationary objects, through a lined screen which is moved relative to a single frame of light-sensitive material during or between exposures, respectively. Thus are produced a plurality of composite pictures in side-by-side relation on a single light-sensitive area, which, after proper processing, can be selectively viewed in succession through a lined screen corresponding to that through which the exposure, or exposures, is made.

The broad idea of taking and viewing composite pictures of the lined screen type is well known, and the prior art shows different methods and apparatus for taking and viewing the same. The prior art teachings, however, have been more or less limited to the idea of taking two or three different pictures on the same film area, each of which depicts an animated subject in two or three successive postures assumed in completing a given motion. Then, when the processed pictures are viewed through the taking or a similar screen, while the screen is being moved across the composite pictures, an illusion of motion is produced. The prior art has also suggested the broad idea of recording motion pictures of a moving object by moving the lined screen continuously across the film while directing the camera at a moving object. In these instances, however, the primary object has been to obtain stereoscopic pictures, or has not been practical for recording a useful motion sequence because of the limited number of different exposures which could be recorded on a given film area. So far as we are aware, there is no prior art which suggests the idea of using this composite picture technique to obtain high-speed movies.

If an illuminated picture area is covered by a screen of opaque and transparent lines of physical dimensions such that for a given picture size approximately 500 lines are present, the picture will appear continuous to an observer at some proper distance, even though only a small percentage of the total picture area is left uncovered by the screen. The viewing distance must be sufficient so that the angular resolution of the screen pattern is beyond that ability of the eye. Since this is only an angular problem, the screen dimensions, and therefore the picture, may be larger solely by moving the observer farther away. We have found that the percentage of used picture area may be as low as 3%, or lower. This leaves 97% of the area of a photographic plate, or other light-sensitive area, to record other pictures in the same manner, each requiring its 3% of the area until the entire plate is exposed. This can be done by moving the lined screen in

2 a camera focal plane a distance equal to the width of one transparent line for each new exposure. There are also many applications for which 500 lines per picture, as described, are not necessary, and we would be satisfied with much lower definition, perhaps even as low as 50 lines per picture. This means that the difficulties of ruling fine screens are improved considerably in some cases.

We have further found that if this screen translation to new positions takes place rapidly, a high-speed sequence of motion pictures may be recorded, the actual number of composite pictures made being limited to the ratio of the width of the transparent and opaque lines of the screen. For example, with a screen in which the transparent lines are .001" in width on .030" centers, 30 pictures may be recorded with a screen motion of only .030 of an inch. Assuming a translation speed of the screen of one inch per second, we have an exposure time of 1/1000 per "frame" for the 30 pictures. Since one inch per second is relatively a very low speed, being 1/17 mile per hour, it is obvious that very great speed, in terms of "frames" per second, is possible. Obviously, the dimensions and speeds given above, by way of example, are only representative and not limiting as to the present invention, because the transparent lines might be .0005" in width on .030" centers to give 60 pictures on a single photographic plate, or any other relation might be used which would satisfy the definition desired in the picture to be produced.

The primary object of the present invention is to provide a camera for taking high speed motion pictures of the composite or lined screen type.

Another object is to provide a camera of the type set forth which is, in reality, nothing but a special camera back which can be detachably connected to a conventional camera in place of the regular removable back with which the camera is normally equipped.

A further object is to provide an apparatus of the type set forth which includes a "capping" shutter adjacent and parallel to the lined screen, and which eliminates the possibilities of double exposure when taking high speed motion pictures.

And yet, another object is to provide an apparatus of the type set forth which is adapted to take groups of high speed motion sequences of composite pictures in multiples less than the maximum possible.

And, another object is to provide an apparatus of the type set forth with which the operator may selectively take single composite pictures of different still subjects in succession for use in a changeable picture apparatus.

And still, another object is to provide an apparatus of the type set forth in which the lined screen and "capping" shutter are driven across the focal plane relative to the light-sensitive surface by a spring at different relative speeds to make the exposure; in which the drive means for the screen and "capping" shutter include a one-way overrunning clutch to prevent bounce at the end of their travel, and combined with said one-way clutch a spring-loaded friction clutch to prevent the screen and "capping" shutter to be moved to a cocked position, and a releasable latch for holding the drive means for the screen and shutter at any and all times it is not manually operated regardless of the position of the screen and shutter in their path of travel.

The novel features that we consider characteristic of our invention are set forth with particularity in the appended claims. The invention itself, however, both as to its organization and its methods of operation, together with additional objects and advantages thereof, will best be understood from the following description of specific embodiments when read in connection with the accompanying drawings, in which:

Figs. 5–8 are enlarged sectional details showing how the lined screen and "capping" shutter co-operate to make an exposure. In these views these two parts are shown in juxtaposition for ease of illustration and understanding, whereas actually they are superposed in the camera. Fig. 5 shows the two in the relative positions they assume at their start position; Figs. 6 and 7 show the relative positions they assume after the first and second .030" of travel of the lined screen, and Fig. 8 shows the relative positions they assume at the end of their travel;

Like reference characters refer to corresponding parts throughout the drawings.

Considering first the embodiment of the present invention as used for solely taking high speed motion pictures, essentially it consists in moving a lined screen and photographic plate rapidly relative to one another in as close parallel relation as practically possible and by an amount sufficient to expose the entire plate. This involves moving a transparent line of the screen relative to the plate by an amount equal to the center line spacing of the transparent lines of the screen. While relative motion between the lined screen and photographic plate in the camera is all that is necessary to record the successive composite pictures, there is some basis for wanting to move the screen alone, rather than the plate alone, or both, in recording high speed motion pictures. Resolution is unimpaired in the vertical plane and any object or reference point in the field whose image is smaller than the width of a transparent line will also be resolved in the horizontal plane. If only the screen moves any such point in space is fixed with respect to the lens and film and so could be used as a reference point in space or time. If the plate moved, the point would be streaked out and this advantage would be lost.

While different proportions between the widths of the transparent and opaque lines of the lined screen could be used to give different numbers of composite pictures, for purposes of disclosing the invention let us assume that the transparent lines are .001" wide and on .030" centers. Such a proportion of transparent to opaque lines in the screen will produce a minimum of 30 different composite pictures in side-by-side relation on the same photographic plate when the screen is moved across the plate by a distance equal to .030" or the center line spacing of the transparent lines. If this screen covers a 4" x 5" photographic plate, then each composite picture will be a 4" x 5" picture made up of approximately 165 lines, which, when viewed through a lined screen identical to the exposure screen, will be .029" apart, but which will give satisfactory definition for continuous tone pictures.

In taking high speed motion pictures it is necessary that the moving lined screen expose the photographic plate only for exactly .030" (in the assumed case) of its linear motion in order to prevent double exposure after all of the sensitized area of the plate has been used. This is accomplished, according to the present invention, by using another moving lined screen as a "capping" shutter immediately in front of and in parallel relation with the lined exposure screen. While the lined screen and "capping" shutter are actually superposed in the camera, for ease of illustration and understanding we have shown them in juxta-relation on an enlarged scale in Figs. 5–8 to describe their function. As shown in Figs. 5–8, the lined screen 10 and the "capping" shutter 11 are disposed in parallel face-to-face relation with the lines of each parallel, and the "capping" shutter will be preferably toward the lens, not shown, while the lined screen will be as close to the photographic plate and focal plane as is practically possible and still allow the screen to move over the plate without scratching the emulsion. In these views the thickness of both the lined screen 10 and "capping" shutter 11 are greatly exaggerated; in actual practise the lined screen preferably being a .005" thick etched metal plate and the "capping" shutter being a photographically exposed glass plate.

As stated above, in the assumed case the transparent lines of the lined screen 10 are .001" wide and on .030" centers with an opaque line between them. The widths of the transparent and opaque lines in the "capping" shutter, when used with this taking screen, will be respectively .010" and .020", or the combined widths of a transparent line, and its adjacent opaque line will be equal to the center line spacing of the transparent lines of the exposing screen 10. The lined screen and the "capping" shutter operate as a shutter device as follows. At the start position of the screen 10 and shutter 11, the two will assume the relative positions shown in Fig. 5 and no light will pass to the photographic plate. The "capping" shutter 11 will now move at 4/3 the rate of speed of screen 10. At the end of the first .030" of screen 10, the transparent slits, or lines, in each, marked with the same reference character, will have retained their same relative position except that the "capping" shutter will have advanced over screen 10 by .010" because of the 4/3 ratio of speeds. This is equal to one-half the width of the opaque lines of the shutter and the combination still passes no light, as shown in Fig. 6.

Figure 6:
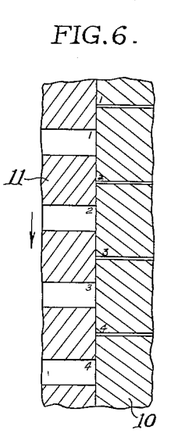
Figure 7:
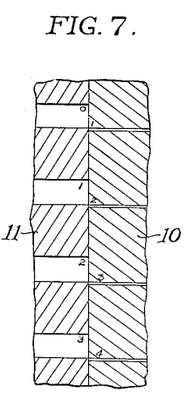
Figure 8:
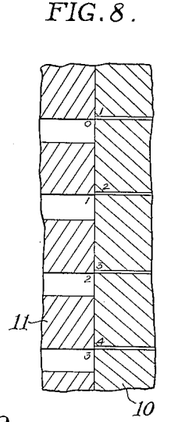

Similarly, at the end of the next .030" travel of screen 10, and, therefore, .040" travel of shutter 11, the relative positions of the screen and shutter shown in Fig. 7 will be attained and the combination still passes no light. Any further motion of shutter 11 relative to screen 10, while both are traveling in the same direction as before, and indicated by the arrow in each of Figs. 5–8, will move transparent line "1" of screen 10 into transparent line "0" of shutter 11, and, therefore, all other transparent lines of screen 10 with all other transparent lines of shutter 11 and the system will pass light. Exposure will continue until shutter 11 has advanced relative to screen 10 a sufficient amount (i. e., .010" in this case) such that the transparent lines of screen 10 begin to move again into the opaque lines of shutter 11, as shown in Fig. 8. This requires exactly .030" motion of screen 10 which is exactly the amount (center line distance of the transparent lines of screen 10) of exposure possible on the photographic plate before double exposure begins.

It follows that we have an additional .060" of motion of screen 10 in which we can stop the system before the transparent line synchronization of the screen and shutter repeats itself to give an exposure. Over all, then, with the dimensions assumed for the purposes of explanation, we have .060" motion to accelerate the screen and shutter system, .030" for exposure purposes and .060" for deceleration, giving a total motion of .150" travel for one series of high speed pictures. Other combinations of screen and shutter dimensions may be developed which will work equally well, depending upon the purpose for which the camera is required. The following formula can be used to calculate the dimensions of the transparent and opaque lines in the shutter and screen, as well as the speed ratios of the two:

$$X^- = \frac{a+c}{a}$$

where $X^-$ = the speed ratio
$a$ = the center line distance of the transparent lines in the screen and shutter which must be equal in any case
$c$ = the width of the transparent lines in the shutter screen.

The number of composite pictures desired on a single photographic plate will determine the value $a$ and $X^-$ will be determined by a speed ratio which is convenient to work into the camera design under consideration.

Figure 5:
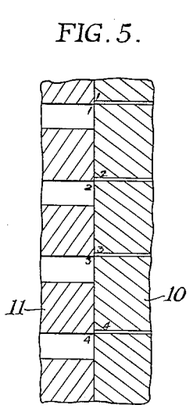

Also, it may not be wise to start and stop the sequence of relative screen and shutter motions with the two in the positions shown in Figs. 5 and 8, since at the beginning or end of the sequence, slight errors in position, or bounce, might serve to open the system to light. It is obviously possible to start and stop the motion of the two with the transparent lines of screen 10 midway in the opaque lines of shutter screen 11 and so make the shutter system really dark. With the dimensions assumed in this case, this would require only a total movement of .090" for the system to provide .030" exposure or 30 composite pictures.

Figure 9:
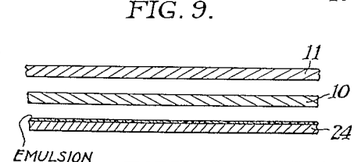
Fig. 9 is an enlarged sectional detail showing the photographic "sandwich" consisting of the photographic plate, lined screen and "capping" shutter as they are relatively disposed in the camera in connection with the direction of the light rays coming from the camera lens, and not as to their relative disposition with respect to each other.
Figure 10:
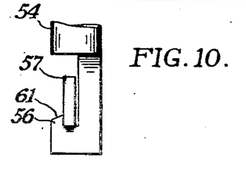
Figs. 10 and 11 are enlarged details of the latch for the lined screen and "capping" shutter and showing it in the locking and released positions, respectively.
Figure 11:
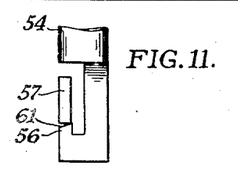

We will now describe an embodiment of a camera applying the foregoing theory consisting of a special adapter back containing the described high-speed components and which adapter back may be detachably connected to the back of a conventional view camera in place of the regular removable back with which such cameras are equipped. The back will contain a photographic "sandwich," as shown in Fig. 9, but in which figure the relative spacing and dimensions of the lined screen 10, "capping" shutter 11, and photographic plate 24 are greatly exaggerated.

Figure 1:
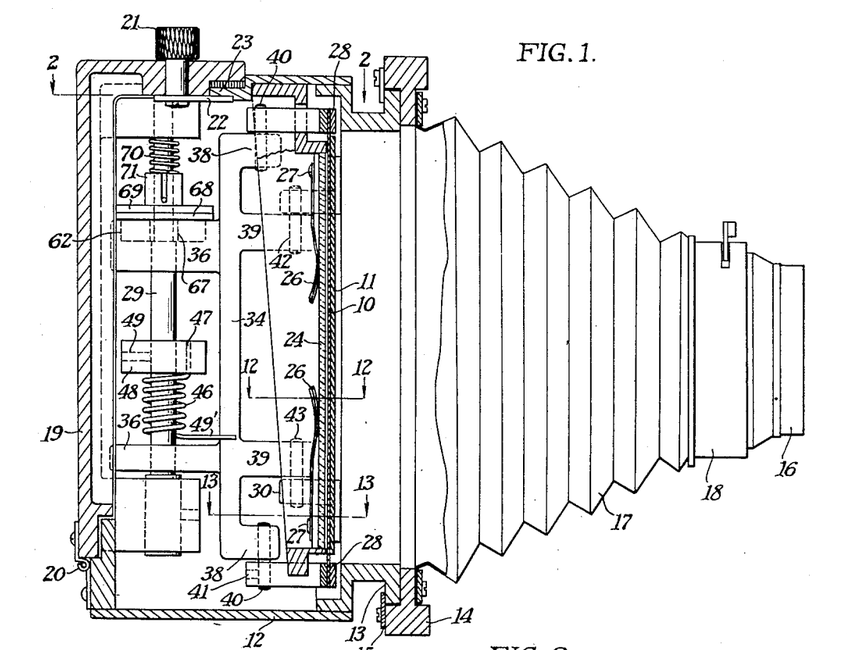
Fig. 1 is a side view of a camera, with the back in vertical section constructed in accordance with one embodiment of the present invention.

Referring now to Figs. 1–11, the special camera back will consist of a rectangular housing 12, the front wall of which will be provided with an opening surrounded by a channel-shaped connecting flange 13 similar to that found on removable backs of conventional view cameras. As shown in Fig. 1, this flange 13 is adapted to be clamped onto the rear of the bellows frame 14 of a camera by the usual slide clamp 15 sliding down into the channel of the flange. As is customary, a lens 16 will be fixed to the forward end of the bellows 17 and the camera may include the usual between-the-lens type of shutter 18 and/or a focal plane shutter, not shown.

Figure 12:
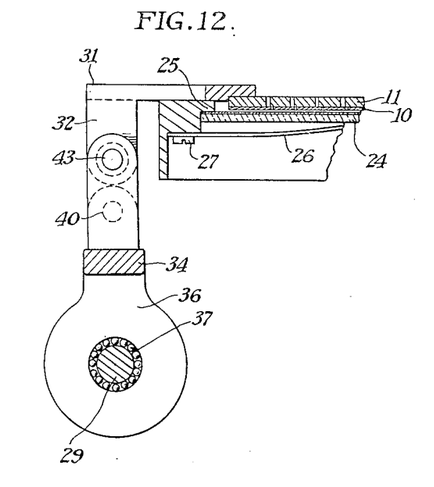
Fig. 12 is an enlarged sectional detail taken substantially on line 12—12 of Fig. 1 and showing the manner in which the "capping" shutter is connected to the driving mechanism.

The housing 12 has a door 19 hinged at the bottom edge at 20, and which door comprises most of the rear wall of the housing and part of the top wall thereof. The door is opened by grasping the knob 21 and turning it to release a latch arm 22 from a latch element 23 on the fixed part of the top wall of the housing. When the door 19 is opened, a 4" x 5" photographic plate 24 can be inserted into the housing and seated on a flanged frame 25 (see Fig. 12) with the emulsion surface directed toward the lens and accurately located in the focal plane of said lens. This plate is held in position on its seat by a pair of spring clips 26 pivoted at one end 27 to said flanged frame 25.

Figure 2:
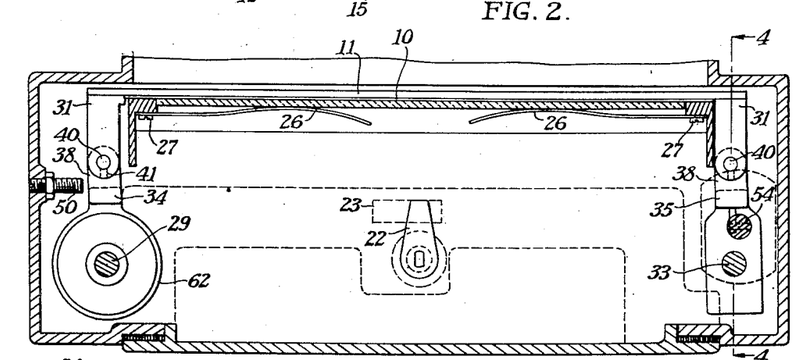
Fig. 2 is a horizontal sectional view taken substantially on line 2—2 of Fig. 1.
Figure 13:
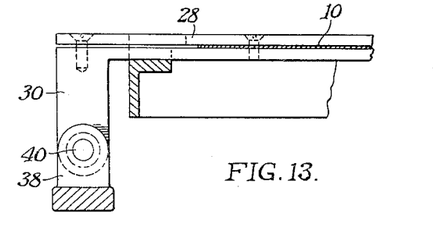
Fig. 13 is an enlarged sectional detail taken substantially on line 13—13 of Fig. 1 and showing the manner in which the lined screen is connected to the driving means.

The lined exposing screen 10 is disposed immediately in front of the photographic plate 24 in parallel relation thereto and generally with the lines thereof extending transversely of the plate and vertically, since most motion which is to be recorded is generally in a horizontal direction. As mentioned above, this lined screen is preferably a .005" thick sheet of copper which has been etched with lines .001" wide and on .030" centers, and must be moved across the photographic plate rapidly and as close thereto as practically possible so that the lines of the screen act as physical masks and eliminate "bleeding" of one composite picture into another. It might be mentioned that this "bleeding" of one composite picture into another is not so important or critical in motion pictures as it is in exposing and viewing separate composite pictures of individual and different stationary objects to be used for changeable picture purposes. In order to hold this lined screen flat, and allow it to be moved rapidly across the photographic plate, it is held in a stretched condition between two pairs of binding strips 28; one pair extending across the top edge of the screen and the other pair along the bottom edge thereof. As shown in Figs. 1 and 2, these binding strips 28 are above and below the top and bottom edges of the photographic plate 24 so that they do not interfere with locating the screen close to the plate. Also, the ends of the binding strips, or at least one thereof, extends beyond both ends of the photographic plate to be connected to the end of driving links 30 which constitute part of a means for translating the screen across the photographic plate. See Fig. 13.

Disposed immediately in front of the lined screen, in parallel relation thereto and with the lines thereof being substantially parallel with the lines of the screen 10, is the "capping" shutter 11. So that this shutter may be moved transversely of the photographic plate and lined screen 10, it has its opposite vertical ends glued, or otherwise fastened, to the end of L-shaped driving links 31, the rearwardly extending arms 32 of which lie in the same vertical plane as driving links 30 for the screen and outside of the ends of the photographic plate to allow the necessary oscillatory movement to translate the shutter, as will be hereinafter described. See Fig. 12.

Figure 3:
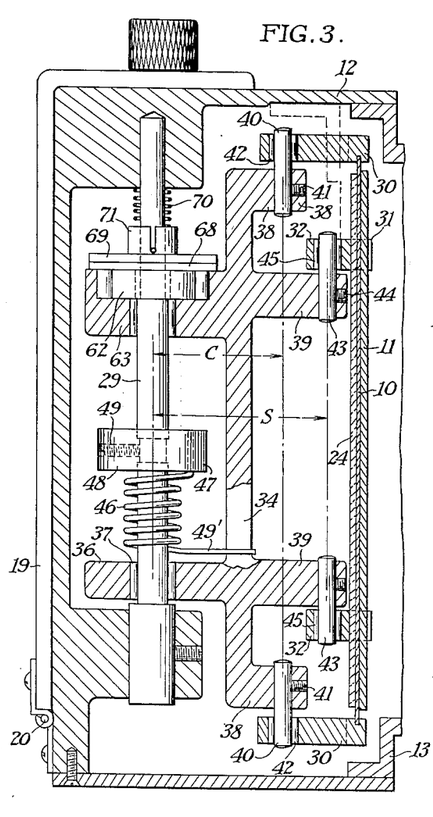
Fig. 3 is a side view of the camera back similar to Fig. 1 but on an enlarged scale.
Figure 4:
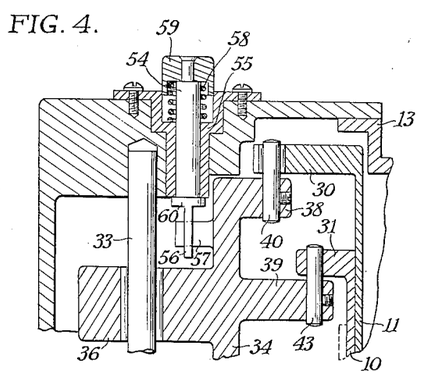
Fig. 4 is an enlarged fragmentary sectional view taken substantially on line 4—4 of Fig. 2 and showing the releasable latch for the lined screen and "capping" shutter driving mechanism.

For driving the "capping" shutter 11 and the lined screen 10 across the photographic plate 24 at the desired 4:3 speed ratio mentioned above, the following driving mechanism is provided. Looking at Fig. 2, in the left-hand end of the housing 12 and extending vertically thereof is a fixed shaft 29, and at the right-hand end there is another fixed shaft 33. A pair of substantially identical driving levers 34 and 35 of the form best shown in Figs. 1 and 3 are oscillatably mounted, one on each of the fixed shafts 29 and 33. Each of the levers has a pair of vertically spaced and rearwardly extending arms 36 connected to the respective shafts 29 and 33 by bearings 37. Each of the levers 34 and 35 includes, at opposite ends, a pair of forwardly extending arms 38 and 39 offset in different horizontal planes, and arms 38 being shorter than arms 39 when considered in relation with the fulcrum axes of the levers which are fixed shafts 29 and 33. The driving links 30, fixed at one end to the lined screen 10, are connected at the other end to the short arms 38 of the driving levers 34 and 35 by pivot pins 40 fastened to the arms 38 by set screws 41 and journalled in the links 30 by bearings 42. Driving links 31 for the "capping" shutter 11 are likewise connected to the long arms 39 of the driving levers by pivot pins 43 connected to the arms by set screws 44 and journalled in the links 31 by bearings 45. The links of the arms 38 and 39 are so chosen that the distances "C" and "S", Fig. 3, at which the "capping" shutter and the lined screen are displaced from the fulcrum axes of the driving levers 34 and 35 is in the ratio of 4:3. Accordingly, as the driving levers 34 and 35 oscillate about their shafts 29 and 33, respectively, the "capping" shutter will be moved across the photographic plate 24 at 4/3 the speed of the lined screen 10. It will be apparent that this speed ratio could be reversed and the same results obtained; i. e., the lined screen could be moved 4/3 as fast as the "capping" shutter, and that the speed ratio of these two parts will vary with the relative dimensions of the widths and spacings of the transparent lines of the screen and shutter selector.

The lined screen 10 and "capping" shutter 11 are normally driven from right to left across the photographic plate 24, looking at Fig. 2, by a coiled spring 46 which encircles shaft 29 and has one end 47 fixed to collar 48 anchored to the shaft by a set screw 49 and has its other end 47' lying against the right-hand edge of driving lever 34, see Fig. 3. The movement of the screen 10 and shutter 11, under the action of spring 46, is limited by adjustable stop pin 50 in the side wall of the housing 12 against which driving lever 34 comes to rest. This stop pin is adjusted so that it will stop the screen and shutter after they have completed a sufficient travel to make the 30 exposures in the assumed case and stop the two in light-obstructing relation.

Figure 14:
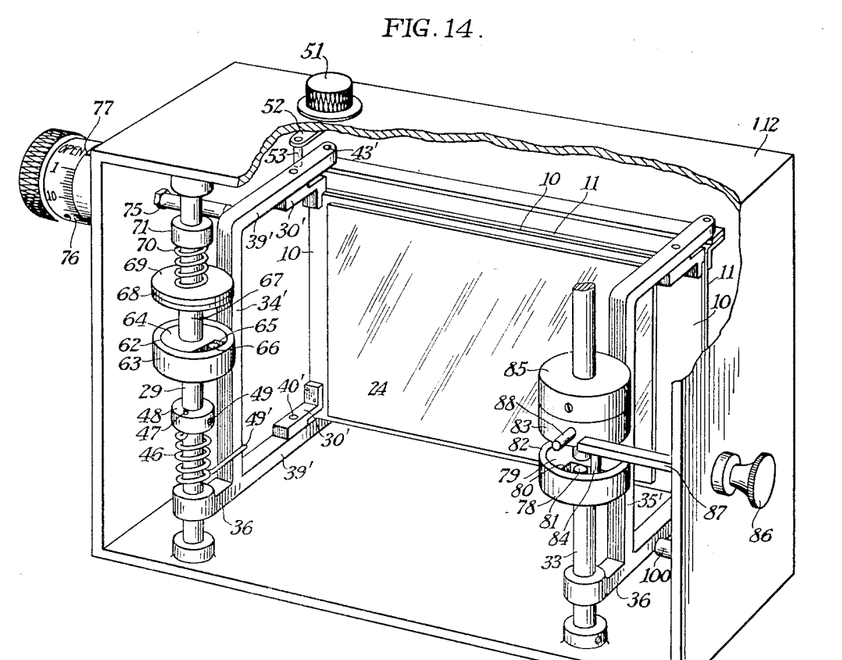
Fig. 14 is a perspective view of a camera back showing another embodiment of the present invention which permits an operator to selectively take the maximum number of pictures at high speed, to take any multiple of the maximum number of pictures at high speed, or to take individual composite pictures of stationary subjects solely for use in changeable picture viewing apparatus.

For moving the screen 10 and "capping" shutter 11 to their starting position, any manually operated means may be provided, such as that shown in the embodiment of the invention in Fig. 14. This cocking means comprises a knurled knob 51 extending through and rotatably connected to the top wall of the housing 12. To the lower end of this knob is fixed an arm 52 from the end of which a pin 53 extends downwardly to engage the left-hand side of a driving lever 34' which is the equivalent of driving lever 34 described. By turning this knob 51 in a counter-clockwise direction, the screen 10 and "capping" shutter 11, along with their driving means, can be moved to the right against the action of spring 46, and to the starting position wherein the parts will be held in a cocked condition by a releasable latch. The knurled knob 51 and associated linkage is normally moved in a clockwise direction by a spring, not shown, to an inoperative position so as not to oppose the spring 46 when driving the parts to make an exposure.

The screen 10 and shutter 11 are releasably held in their cocked starting position by a releasable latch mechanism comprising stud 54 extending through and being slidably mounted in a sleeve 55, seated in a bore through the top wall of the housing 12. See Figs. 4, 10 and 11. The lower end of the stud is provided with a hooked end 56 into which a latch element 57 on the driving lever 35 is adapted to snap and be locked against movement. The stud is normally raised to a latching position relative to latch element 57 by means of a coiled spring 58 surrounding the upper end of the same and held under compression between an enlarged portion of the sleeve and a cap 59 riveted to the top of the stud. A flange 60 on the lower end of the stud 54, larger in diameter than the opening in the sleeve, prevents the stud from being forced out of the sleeve by the spring, and acts to locate the hooked end of the stud in a position to receive the latch element 57. The cam face 61 on the edge of the hooked end adjacent the latch element permits the latter to cam the stud downwardly against its spring and snap into latching engagement therewith when the screen and shutter are moved to their cocked positions. When the stud 54 is depressed by applying pressure to cap 59 thereof, the driving mechanism for the screen and shutter is released and the two run off to make the 30 exposures at high speed. It will be understood that before the screen and "capping" shutter are cocked that the conventional between the lens type shutter 18 and/or the focal plane shutter of the camera, if so equipped, must be closed to prevent accidental exposure of the plate. Then, when it is desired to make an exposure, and before the stud 54 is depressed, the conventional camera shutter is opened on "bulb" and left open until after the exposures are made by the passage of the lined screen 10 and "capping" shutter across the photographic plate.

In order to prevent the lined screen 10 and "capping" shutter 11 from bouncing back when they reach the end of their travel, and possibly make a double exposure of the last couple of composite pictures taken, the following means are provided. A one-way overrunning clutch 62 is connected between the driving lever 34 and the fixed shaft 29, said clutch permitting the driving lever to move freely to the left under the action of spring 46, by grabbing to prevent the lever from moving in the opposite direction. As most clearly shown in the embodiment of Fig. 14, this clutch comprises a circular shell 63 fixed to the driving lever 34 and embracing a generally stationary disk 64 fixed to shaft 29. The disk 64 includes a plurality of cam slots 65 around its periphery in which balls, or rollers, 66 are disposed in the manner well known to permit the shell 63 to rotate freely in a counterclockwise direction, but to frictionally grab and lock the shell to the stationary disk 64 should the shell attempt to rotate clockwise as it would as the result of bounce at the end of the travel of the driving lever 34.

In order to permit the screen 10 and shutter 11, along with their driving mechanism, to be manually cocked, the stationary disk 64 of the one-way overrunning clutch 62 is connected to the stationary shaft 29 through a spring-loaded friction clutch, rather than being connected to the shaft 29 directly, which would prevent cocking of the device. Accordingly, the disk 64 is connected to a sleeve 67 rotatably mounted on shaft 29 and on the end of which there is mounted a friction disk 68. This disk 68 is, in turn, frictionally engaged by another friction disk 69 fixed to the shaft 29 so as to be incapable of rotation but free to slide axially thereof. A coiled spring 70 connected at one end to a collar 71 fixed to shaft 29 and at the other end to friction disk 69 normally forces disk 69 into frictional contact with disk 68 with sufficient pressure to oppose any force available, tending to rotate the stationary disk 64 of clutch 62 clockwise due to bounce, but which can be overcome by manual adjustment of the cocking knob 51. If the end of the spring 70 is connected to disk 69, then the torsion in this spring may be relied upon to oppose any bounce effect of the screen 10 and shutter 11 upon reaching the end of their travel.

In operation, this high-speed camera above described would function as follows. The high speed adapter back would be mounted on the camera and its spring drive cocked to the starting position shown in Fig. 5 by turning cocking knob 51 counterclockwise. An unexposed photographic plate 24 would then be inserted into the camera back through the door 19. Then, the regular between-the-lens type shutter 18 and/or the regular focal plane shutter, if the camera is so equipped, is opened on "bulb." The high speed release 54—56 is then tripped and the exposure of 30 composite pictures (in the assumed case) at high speed takes place; the one-way overrunning clutch 62 taking over at the end of the screen and "capping" shutter travel to prevent a return of either of these parts due to bounce and thus preventing a double exposure of the last couple of composite pictures. The regular camera shutter 18 is then closed and the photographic plate 24 replaced for the next exposure. It will also be feasible to couple both the regular camera shutter release with the release for the screen and "capping" shutter so that the two will be released in proper sequence by a single operation.

Referring now to Fig. 14, we have shown another embodiment of the present invention which possesses the following improvements and advantages over the high speed camera described above. (1) It permits the taking of single still composite pictures at any desired time interval, in addition to the taking of high speed motion pictures. Based on the assumed case of .001" wide transparent screen lines on .030" centers, any number between 1 and 30 different composite pictures may be taken, if the camera to which this special adapter back is attached is equipped with a regular shutter of its own. If, however, the "capping" shutter of this device is used, the maximum number of pictures that can be taken will be reduced to 15. (2) The single composite pictures may be taken adjacent to each other or with a separation whose maximum amount depends upon the number of different pictures to be exposed. For instance, with 5 different pictures, the separation can be as much as .006". This separation of individual pictures is a distinct advantage in viewing the developed images of separate still subjects through a lined screen as merely changeable still pictures, because one picture will not tend to "bleed" over into the other and distort the definition. This "bleeding"-over effect is not important or critical when the adjacent composite pictures represent successive sequences of a moving object as obtained in high speed pictures, because the successive pictures dissolve readily into one another. (3) This modified device permits the taking of groups of high speed pictures. If, for instance, a group of 9 pictures is sufficient to study a recorded event, i. e., the finish of a horse race, then three groups can be taken at any desired time on a single photographic plate, each group consisting of 9 pictures.

Referring now to Fig. 14, this modified camera adapter back is the same as that described above in that it comprises a housing 12 containing a photographic "sandwich" consisting of a regular photographic plate 24 which is rigidly held in place with its emulsion surface directed toward, and located in the focal plane of, the camera lens, the lined screen 10 immediately in front of the photographic plate and a "capping" shutter 11 in front of the lined screen. For purposes of illustration it will be assumed that the lined screen and "capping" shutter have exactly the same transparent line widths and center line spacings as assumed in connection with the above disclosed high speed camera. The lined screen 10 and "capping" shutter 11 are driven with a translatory motion and at a 3:4 differential of speed by a spring 46 through driving levers 34' and 35' to which the screen 10 and "capping" shutter 11 are pivotally connected to have the desired ratio of driving distances about stationary shafts 29 and 33. In this instance the driving levers 34' and 35' are a little different in shape than those in the first described embodiment, the supporting frame for the "capping" shutter 11 being directly pivoted at 43' to the end of arm 39' of the driving levers 34' and 35' and lined screen 10 being pivoted at 40' to the same arm 39' of the driving levers through links 30' which are the equivalent of driving links 30 disclosed in the embodiment of Fig. 1. As before, the driving lever 34' is connected to the stationary shaft 29 through a combination of one-way overrunning clutch 62 and a friction clutch including friction disks 68 and 69. This combination of clutches prevents a rebound of the screen and "capping" shutter at the end of their travel but permits them to be manually cocked through operation of the winding knob 51.

Coming now to the structural differences between this embodiment of the invention and that first described, instead of the adjustable stop pin 50 of the Fig. 1 embodiment, we provide a calibrated screw 75 extending through, and in threaded engagement with, the side wall of the housing 12, and which screw extends into the path of driving lever 34' and limits the movement of levers 34' and 35' under the action of driving spring 46. This adjustable stop screw 75 is provided with a dial 76 cooperating with an index 77; said dial, in addition to its "open" mark, having 29 divisions, each representing a position of the lined screen 10 for taking one composite picture.

To permit the selective use of this adjustable stop screw 75, a different kind of releasable latch for holding the screen 10 and shutter 11 in a tensioned condition is required. As shown in Fig. 14, this releasable latch comprises a one-way overrunning clutch 78 of the cam roller type, consisting of a disk 79 having a plurality of cam slots disposed around its periphery (one being shown at 80), in each of which a ball or roller 81 is located; said disk being fixed to stationary shaft 33. Rotatably encasing fixed disk 79 and confining the ball, or roller, 81 is a sleeve 82 which is fixed to the driving lever 35' of the screen 10 and "capping" shutter 11. The cam slots 80 are so arranged that the sleeve 82 may turn clockwise freely for winding up the screen and shutter, but will normally lock the sleeve 82 to the fixed shaft 33 to prevent the screen and shutter from moving to the left under the action of spring 46. For selectively freeing the sleeve 82, there is provided an oscillatable disk 83 having a downwardly extending pin 84 normally lying between the ball or roller 81 and the narrow end of the cam slots 80. This disk 83 is oscillatably connected to a disk 85 pinned to the fixed shaft 33 and normally spring pressed in a counterclockwise direction to the position shown in Fig. 14 by a spring, not shown, between itself and a disk 85. Clutch 78 is freed by pressing on release button 86 extending from the right-hand end wall of the housing 12, and to which is connected a bar 87. This causes the end of bar 87 to engage a pin 88 extending from the periphery of oscillatable disk 83 whereupon the disk 83 is oscillated clockwise, causing its pin 84 to move the ball 81 out of the narrow end of the cam slot 80 and thus free sleeve 82. A spring, not shown, normally moves bar 87 and release button 86 to the right to allow the clutch 78 to grab and lock the sleeve 82 against movement, or the spring normally acting on oscillatable disk 83 may be relied upon for this result.

The operation of this embodiment of the invention would be as follows: The housing 12 would be mounted on a conventional view camera in place of the regular camera back and its spring drive cocked to the starting position by turning knob 51 counterclockwise until driving lever 35' strikes a stop 100 extending from the end wall of the housing. If a new photographic plate 24 has been inserted into the housing prior to this cocking operation, then the operator should be sure that the regular camera shutter, whether it be a between-the-lens type, as shown at 18 in Fig. 1, or a focal plane type, not shown, is closed so that the plate will not be accidentally exposed. Now, if 30 high speed pictures are to be taken at one exposure, the dial 76 of screw 75 is set with its "open" marking opposite index 77. This allows the driving levers 34 and 35 to travel their full distance to the end position. After the regular camera shutter is opened on "bulb," the drive is then released by pushing button 86. If groups of high-speed pictures are to be taken, for instance three groups of nine pictures, the dial 76 is set at 10 and the cocked drive is released by pushing button 86. The run-off movement of the driving levers 34' and 35' is stopped each time by the end of the adjustable screw 75. The amount of this movement determines, of course, the number of pictures taken, in this case nine; one being lost because the "capping" shutter remains open. When the second group is to be taken, the dial 76 of the calibrated screw is set at 20 and, while the screw is moved to a new position, driving levers 34' and 35' are held in place by the clutch release 78. The push button 86 is then again depressed to release the drive and the next nine pictures are exposed. This procedure is then repeated for the third time after setting the dial 76 to its final position, or with the "open" marking opposite the index 77.

In taking groups of pictures less than the total number possible (30 in the assumed case), the "capping" shutter 11 really serves no useful function since it remains open at all intermediate points between the starting and end positions of the screen and shutter at which these parts may be stopped. For instance, in the above assumed case of three groups of pictures, it is apparent that only 3 groups of nine pictures was possible, or a total of 27, rather than 30, because of stopping the device three times with the "capping" shutter open. Each time the device is stopped short of its complete travel, one composite picture is left blank, or unexposed. Accordingly, if the "capping" shutter is used when taking single composite exposures, only 15 different pictures are possible, each being separated by a blank space. Rather than being a disadvantage, this is, in fact, an advantage, since it is desirable in a composite picture made up of a plurality of single different exposures for changeable sign purposes to have each picture separated by a certain amount from the successive picture in order to eliminate the chance of one picture "bleeding" over into the other when viewed through a lined screen similar to that through which they were exposed.

It follows then that if the device is to be used for taking groups of high speed pictures less than the maximum number possible, or it is not objectionable to waste a couple of pictures due to double exposure, or different single exposures are to be taken, then the "capping" shutter could be left off the device and only the lined screen 10 used with the remainder of the mechanism dispensed. With or without the "capping" shutter 11, if separate single exposures are desired on the photographic plate a total of 30 can be obtained if the regular camera shutter 18 is used to make each exposure and the drive for the lined screen 10 and "capping" shutter 11 is used only to uncover successive areas of the photographic plate 24 after each exposure. In this instance the regular camera shutter 18 would not be opened at "bulb," but would be operated after the dial 76 had been advanced one mark and the release button 86 was subsequently operated to allow the lined screen 10 to advance to the new position determined by the adjustable screw 75. By the same token, any blank spacing desired could be obtained between individual pictures by proper adjustment of dial 76. The "capping" shutter 11 would also be done away with if the regular camera shutter 18 was set to give an exposure equal in time to the time required for the screen to travel the distance required to make a selected number of high speed motion pictures and the release of the lined screen was synchronized with the release of the camera shutter so that the shutter would remain open only so long as it took the screen to travel the distance to expose the desired number of pictures. For instance, if it were desired to make 30 high speed pictures, as in the assumed case, and the spring 46 were capable of driving the screen 10 .030" in 1/25 of a second, then if the regular camera shutter was set to give 1/25 of a second exposure and operated in synchronism with the release of the screen drive, counting for acceleration time of the screen and opening and closing time of the camera shutter 18, the desired 30 exposures could be made without the use of the "capping" shutter. The synchronization problem involved would be similar to that encountered in flash photography and could be accomplished by a synchronizing device similar to that found in conventional flash synchronizers. It might be pointed out that if the device is used in this way only a between-the-lens type of shutter on the camera would work and that a focal plane shutter on the camera would be inoperative.

Although we have shown and described certain specific embodiments of our invention, we are aware that many modifications thereof are possible. Our invention, therefore, is not to be limited to the precise construction details set forth and described, but is intended to cover all modifications coming within the scope of the appended claims.

Having thus described our invention, what we claim is new and desire to secure by Letters Patent of the United States is:

1. A photographic camera for taking a plurality of different composite pictures in side-by-side relation on a single frame of light-sensitive material and comprising a lens; means for locating a frame of a light-sensitive material in the focal plane of said lens, a lined screen movably mounted directly in front of said frame and in parallel relation thereto, said screen including a plurality of spaced parallel transparent lines extending transversely of the screen and each spaced from the other by a linear area opaque to the rays to which said frame is sensitive and which opaque areas are wider than said transparent lines by an even multiple of the width of said transparent lines; a "capping" shutter movably mounted in front of said frame and substantially in face-to-face contact with said lined screen, and consisting of a plurality of parallel alternating transparent and opaque linear areas extending transversely of said frame and parallel to the lines of said screen, the transparent lines of said "capping" shutter being wider than the transparent lines of said screen, and the combined width of a transparent line and an adjacent opaque line of said shutter being equal to the centerline spacing of two successive transparent lines of said screen, whereby at any time one opaque line of said shutter is covering a transparent line of said screen, every other opaque line of the shutter is covering a different transparent line of the screen; means for driving said "capping" shutter and said lined screen across said frame in a direction substantially at right angles to the lines thereof from a starting position to an end position in each of which positions the opaque lines of said shutter cover corresponding transparent lines of said screen, said driving means moving said screen and shutter at different rates of speed so that during the travel across said frame the transparent lines of said screen and shutter are in alignment to expose said frame for a distance of travel of the screen equal to the centerline spacing of the transparent lines of said screen; means for moving both said screen and "capping" shutter to, and holding them in, their starting position; and means for releasing them simultaneously.

2. A photographic camera according to claim 1 in which the driving means for said lined screen and shutter comprises a spring motor common to the two, a driving mechanism between said spring motor and each of said lined screen and shutter having different drive ratios to produce the different rates of speed for the two to make the exposure.

3. A photographic camera according to claim 1 in which the driving means for said lined screen and shutter comprises a spring motor common to the two, a driving mechanism between said spring motor and each of said lined screen and shutter having different drive ratios to produce the different rates of speed for the two to make the exposure, and means associated with each of said driving mechanisms to prevent the lined screen and/or "capping" shutter from bouncing back when they reach their end positions and thus bring the transparent lines of the two into alignment to cause a double exposure.

4. A photographic camera according to claim 1 in which the driving means for said lined screen and shutter comprises a spring motor common to the two, a driving mechanism between said spring motor and each of said lined screen and shutter having different drive ratios to produce the different rates of speed for the two to make the exposure, and an overrunning one-way clutch between the driving mechanisms of said lined screen, "capping" shutter and a stationary part of said spring motor to prevent the screen and shutter from bouncing back when they reach their end position and thus accidentally bring the transparent lines of the two into alignment to cause a double exposure.

5. A photographic camera according to claim 1 in which the driving means for said lined screen and shutter comprises a spring motor common to the two, a driving mechanism between said spring motor and each of said lined screen and shutter having different drive ratios to produce the different rates of speed for the two to make the exposure, an overrunning one-way clutch between the driving mechanisms of said lined screen, "capping" shutter and a stationary part of said spring motor to prevent the screen and shutter from bouncing back when they reach their end position, means for moving said lined screen and "capping" shutter to their starting position against the action of said spring motor, and a clutch connection between said overrunning one-way clutch and said stationary part of the spring motor permitting said lined screen and shutter to be moved to their starting positions despite the presence of said overrunning one-way clutch.

6. A camera back for taking a plurality of different composite pictures in side-by-side relation on a single frame of light-sensitive material and adapted to be detachably connected to the rear of a camera having a lens and conventional between-the-lens type shutter in place of the regular camera back, and comprising a housing having an open side bounded by a connecting flange adapted to engage the rear of the camera with a light-tight connection, means for positioning a frame of light-sensitive material in said housing facing said open side thereof whereby said frame will lie in the focal plane of the camera lens when said housing is attached to the camera, a lined screen mounted immediately in front of said frame to move across the same in parallel relation thereto, said screen including a plurality of spaced parallel transparent lines extending transversely of the screen and each spaced from the other by a linear area opaque to the rays to which said frame is sensitive, and which opaque areas are wider than said transparent lines by a multiple of the width of said transparent lines, drive means for translating said screen across said frame in a direction substantially at right angles to the lines thereof from a starting position to an end position which involves a travel of any one transparent line of the screen through a distance equal to the center-line spacing of said transparent lines and the exposure of a group of composite pictures on said frame equal in number to the ratio between the width of said transparent and opaque lines; means for repeatedly and selectively stopping said screen at any point in its travel from its starting position so that any desired number of composite pictures, equal to or less than the maximum possible, may be taken at one exposure, and a manually releasable latch for holding said screen against movement in any position of its travel from starting position to said end position.

7. A camera back according to claim 6 including an overrunning one-way clutch between a part of the driving means for said screen and a stationary part of the housing to prevent the screen from bouncing back when it reaches its end position and thereby causing an accidental double exposure.

8. A camera back according to claim 6 in which said drive means for the screen includes a spring motor normally tending to drive said screen from its starting position to said end position.

9. A camera back according to claim 6, including an overrunning one-way clutch between a part of the driving means for said screen and a stationary part of the housing to prevent the screen from bouncing back when it reaches its end position, and a friction clutch between said one-way clutch and the stationary part of the housing permitting said screen to be intentionally moved from its end position to its starting position despite the presence of said one-way clutch.

10. A camera back according to claim 6 in which said drive means for said screen comprises a rigid shaft, a lever journalled at one end on said shaft and pivotally connected at the other end to said screen, a spring normally acting on said lever to swing it in a direction about said shaft to move the screen toward its end position, an overrunning one-way clutch between said lever and said shaft permitting the lever to run freely under the action of said spring, but preventing it from bouncing back when the screen reaches said end position.

11. A camera back according to claim 6 in which said drive means for said screen comprises a rigid shaft, a lever journalled at one end on said shaft and pivotally connected at the other end to said screen, a spring normally acting on said lever to swing it in a direction about said shaft to move the screen toward its end position, an overrunning one-way clutch between said lever and said shaft permitting the lever to run freely under the action of said spring, but preventing it from bouncing back when the screen reaches said end position, means for manually returning said screen and its driving means to said starting position in which the spring is again tensioned, and a spring-loaded friction clutch between the stationary member of said overrunning one-way clutch and said shaft permitting said screen and its driving means to be returned to said starting position, said friction clutch possessing enough resistance to overcome any tendency the screen and its driving means has to bounce back upon reaching said end position.

12. A camera back according to claim 6 in which said means for repeatedly and selectively stopping said screen at any point in its travel comprises an adjustable stop located in the path of movement of a part of said screen driving means to limit its extent of travel when moving from said starting position, a manually controlled knob for adjusting the position of said stop and calibrated in increments corresponding to the width of said transparent lines of said screen.

13. A camera back according to claim 6 in which said means for repeatedly and selectively stopping said screen at any point in its travel comprises an adjustable stop located in the path of movement of a part of said screen driving means to limit its extent of travel when moving from said starting position, a manually controlled knob for adjusting the position of said stop and calibrated in increments corresponding to the width of said transparent lines of said screen, and in which said manually releasable latch comprises a normally grabbing one-way clutch between the driving means for said screen and a stationary part of said housing, and means for manually releasing said clutch.

14. A camera back for taking a plurality of different composite pictures in side-by-side relation on a single frame of light-sensitive material and adapted to be detachably connected to the rear of a camera having a lens and conventional between-the-lens type shutter in place of the regular camera back, and comprising a housing having an open side bounded by a connecting flange adapted to engage the rear of the camera with a light-tight connection, means for positioning a frame of light-sensitive material in said housing facing said open side thereof whereby said frame will lie in the focal plane of said camera lens when said housing is attached to the camera, a lined screen mounted immediately in front of said frame and consisting of a plurality of transparent parallel lines extending transversely of the screen and spaced from each other by linear areas opaque to the rays to which said frame is sensitive, said opaque areas being wider than said transparent lines by a multiple of the width of said transparent lines, means for causing a relative movement between said screen and said frame in a direction substantially at right angles to the lines of said screen from a starting position to an end position which involves a travel of any one transparent line of the screen over a length of the frame equal to the centerline spacing of the transparent lines of the screen and the exposure of a group of composite pictures on said frame equal in number to the ratio between the widths of said transparent and opaque lines; means for repeatedly and selectively stopping the motion of said frame and screen at any point short of the complete travel of the two so that any desired number of composite pictures equal to or less than the maximum possible may be taken at one exposure, and a manually releasable latch for holding said screen and frame against movement in any position of their travel for said starting position to said end position.

15. A camera back for taking a plurality of different composite pictures in side-by-side relation on a single frame of light-sensitive material and adapted to be detachably connected to the rear of a camera having a lens and conventional between-the-lens type shutter in place of the regular camera back, and comprising a housing having an open side bounded by a connecting flange adapted to engage the rear of the camera with a light-tight connection, means for positioning a frame of light-sensitive material in said housing facing said open side thereof whereby said frame will lie in the focal plane of said camera lens when said housing is attached to the camera, a lined screen movably mounted in front of said frame and in parallel relation thereto, said screen consisting of a plurality of parallel transparent lines extending transversely of the screen and each spaced from the other by a linear area opaque to the rays to which said frame is sensitive and which opaque lines are wider than said transparent lines by an even multiple of the width of said transparent lines, a "capping" shutter movably mounted adjacent and in parallel relation to said lined screen, and consisting of a plurality of parallel alternating transparent and opaque lines extending transversely of said frame and parallel to the lines of said screen, the transparent lines of said "capping" shutter being wider than the transparent lines of said screen and the combined width of a transparent line and an opaque line of said shutter being equal to the centerline spacing of two successive transparent lines of said screen, whereby at any time one opaque line of said shutter is covering a transparent line of said screen every other opaque line of the shutter is covering a different transparent line of the screen; means for driving said "capping" shutter and said lined screen across said frame in a direction at right angles to the lines thereof from a starting position to an end position in each of which positions the opaque lines of said shutter cover corresponding transparent lines of said screen and at different rates of speed, so that during the travel across the frame the transparent lines of said screen and shutter are in alignment to expose said frame for a distance of travel of the screen equal to the centerline spacing of two successive transparent lines of said screen, said driving means including a driving lever oscillatable about a fixed axis, a source of power normally acting on said lever to move it in one direction about said axis, means for pivotally connecting said screen and shutter to the other end of said lever at different distances from said fixed axis in accordance with said different rates of speed desired for said screen and shutter, means for normally moving said screen and shutter to their starting position against the action of said power source, and means for releasably holding said screen and shutter in said starting position.

16. A camera back according to claim 15 including an overrunning one-way clutch and a friction clutch in combination between said driving lever and a stationary part to eliminate bounce of said lever when said screen and shutter reach said end position and to permit said lever to be manually oscillated against the action of said power source for moving said screen and shutter to their starting position.

17. A camera back according to claim 15 including a manually adjustable stop for engaging and limiting the travel of said driving lever and the screen and shutter connected thereto, an adjusting knob for adjusting said stop and calibrated in increments corresponding to multiples of the width of the transparent lines of said screen, whereby the movement of said screen and shutter can be selectively limited to any fraction of their complete possible travel, and a manually releasable latch for engaging and holding said driving lever against movement at any time it is not actuated.

18. A camera back according to claim 15 including a manually adjustable stop for engaging and limiting the travel of said driving lever and the screen and shutter connected thereto, an adjusting knob for adjusting said stop and calibrated in increments corresponding to multiples of the width of the transparent lines of said screen, whereby the movement of said screen and shutter can be selectively limited to any fraction of their complete possible travel, and a manually releasable latch for engaging and holding said driving lever against movement at any time it is not actuated, and comprising an overrunning one-way clutch between said drive lever and a stationary part in said housing arranged to normally lock said lever against motion in the direction as driven by said power source, and a manually operated release member for selectively releasing said clutch to free said driving lever.

FORDYCE E. TUTTLE.
WILLIAM BORNEMANN.

REFERENCES CITED

The following references are of record in the file of this patent:

UNITED STATES PATENTS

| Number | Name | Date |
|---|---|---|
| 1,260,682 | Kanolt | Mar. 26, 1918 |
| 2,203,651 | Capstaff | June 4, 1940 |
| 2,322,733 | Steiner | June 22, 1943 |